June 30, 1931.        E. G. McCAULEY        1,812,269
FLUID PRESSURE BRAKE CONTROL
Filed Aug. 13, 1928
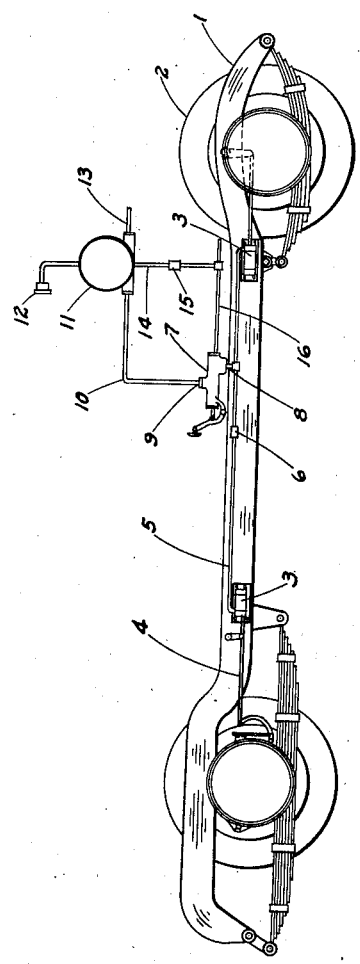
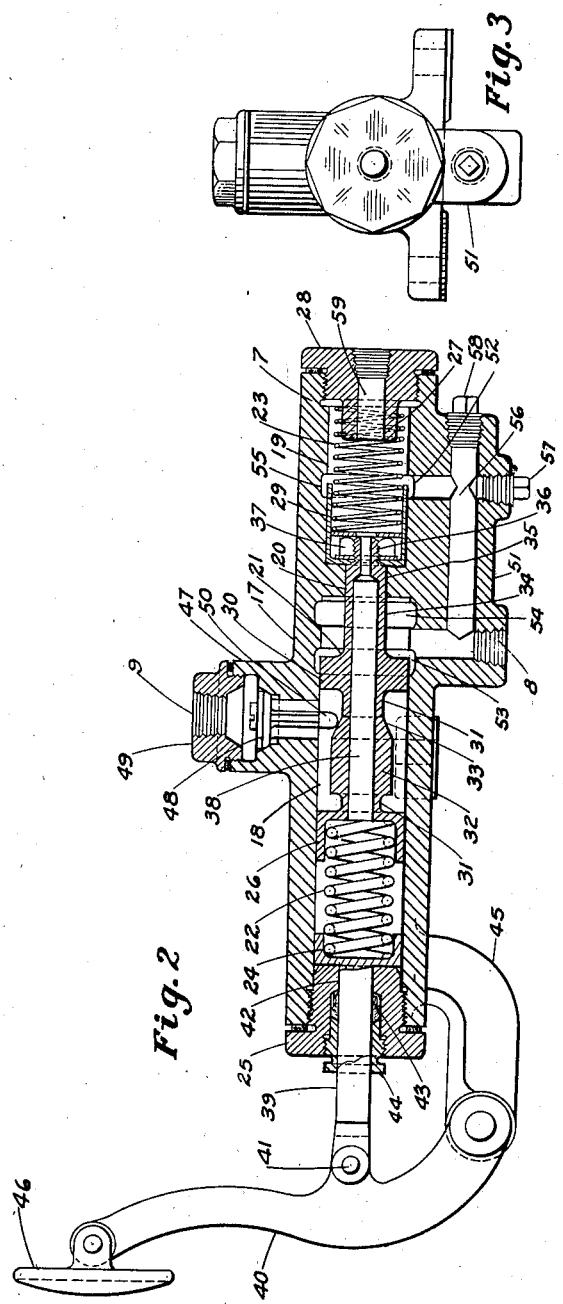
INVENTOR
ERNEST G. McCAULEY
BY
ATTORNEY Patented June 30, 1931

1,812,269

UNITED STATES PATENT OFFICE

ERNEST G. McCAULEY, OF DAYTON, OHIO

FLUID PRESSURE BRAKE CONTROL

Application filed August 13, 1928. Serial No. 299,385.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates generally to a device for controlling the fluid pressure for operating a brake or similar mechanism.

The primary object of this invention is to provide a balanced control valve having a pressure regulating device, permitting a range of pressure on the brake from zero to maximum pressure, to be applied and held depending upon and proportionate to the amount of opening of the control valve.

A further object of this invention is to provide a balanced control valve with means for automatically controlling the pressure from a source of supply to the balanced valve when the valve is moved beyond its normal closed position.

Another object of this invention is to provide a piston type balanced valve manually opened and which is automatically closed by the fluid pressure after a predetermined pressure is applied on the part to be operated.

A further object is to provide a piston type balanced valve to maintain a closed position at all times by the fluid pressure, except when the balance of the valve is overcome by a manual application to open the valve.

A further object is to provide a piston type balanced valve for admitting the fluid pressure from a source of supply to a part to be operated, and maintain a predetermined pressure upon the operated part.

In the accompanying drawings:

Fig. 1 is a side elevation as applied to a vehicle chassis showing a braking system embodying my invention.

Fig. 2 is a longitudinal sectional view of my invention.

Fig. 3 is an end view looking from the right of Fig. 2.

Referring to the drawings the numeral 1 designates the usual chassis of an automobile having a brake mechanism (not shown) of any well-known type applied to the wheels 2. The brake mechanism of the wheels on each side of the chassis are operated by fluid pressure cylinders 3 rigidly attached on each side of the chassis frame, and are connected to the braking mechanism in any suitable manner, such as by rod and lever connections 4.

Pressure fluid lines 5 on each side of the chassis are inter-connected through a T pipe connection 6 with an intermediate pipe (not shown) so that the fluid pressure is equalized at each cylinder.

The balanced control valve unit 7 is suitably mounted on the chassis frame and held through the supports (not shown) and is provided with an outlet 8 connecting with the fluid line 5, and an inlet 9 connected through pipe 10 with a pressure tank 11 having a pressure gage 12.

The fluid pressure is supplied to the tank 11 through line 13 from any well-known source of supply (not shown). A by-pass line 14 having a relief valve 15 leads from the tank 11 and is connected with the line 16 leading from the control unit 7 to the source of supply. This part of the pressure system is similar in function to that portion as shown and described in my former application Serial No. 755,954 filed December 15, 1924.

The balanced valve unit 7 is formed of a cylindrical casing 17 having cylindrical bores 18 and 19 which are separated by a partition 20. Positioned within the cylindrical bores 18 and 19 is a balanced valve member 21 which is yieldingly supported at each end of the casing 17 by springs 22 and 23. The spring 22 is retained in place at one end of the cylindrical casing 17 between a cup shaped member 24 bearing against the casing head nut 25 which closes one end of the casing 17 and a cup shaped piston 26 of the balanced valve member 21. Whereas the spring 23 is retained in place by means of a projection 27 formed on a casing head nut 28 and threaded into the other end of the cylindrical casing 17 and a cup shaped valve closure 29 in which the inner end of the coil spring 23 is nested.

The balanced valve member comprises two opposed piston members 26 and 30, which are integrally joined together by a valve stem 31. The cross sectional area of the valve stem is uniform at both ends but of less area than the cross sectional area of the piston members. Intermediate of the end portions of the stem 31 is an enlarged cylindrical boss 32 provided with a conical taper portion 33 at one end for the purpose hereinafter described.

Extending rearwardly and integral with the piston member 30 is a stem 34 which passes through an opening 35 in the partition 20. The extreme end of the stem 34 is a reduced threaded portion 36 upon which the cup shaped valve closure 29 is mounted and secured by a nut 37. The balanced valve member is also provided with a bore 38 extending through its entire length for draining the cylinder 19 in front of piston 26 from any fluid pressure.

Integral with the cup shaped member 24 is a rod 39 pivotally connected to a foot lever 40 by means of a pin 41. The rod 39 operates slidably within a bore 42 formed in the casing nut 25. The bore 42 at its outer end is enlarged to receive the packing 43 and threaded gland nut 44. The foot lever 40 is pivotally mounted at its lower end on an extension arm 45 which is integral with the casing 17 and at its upper end is provided with a foot pedal 46 pivotally secured thereto.

Extending upwardly from the cylindrical casing 17 is an apertured projection 47 to provide a seat and guide for the check valve 48 and which is threaded to receive a gland nut 49 above the check valve. Gland nut 49 is also provided with a tapped inlet opening 9.

The check valve 48 is provided at its lower end with a rounded projection 50 that extends substantially to the bottom of the stem 31 and adjacent the tapered portion 33 of the balanced control valve 21 so that as the balanced valve is reciprocated the check valve 48 is opened and closed.

Projecting downwardly from the casing 17 is a substantially rectangular projection 51 provided with outlet port 8 leading to the cylinders 3 as above described and a relief or drain port 52. The cylinder 18 is provided with two spaced concentric recesses 53 and 54 which are in communication through the outlet port 8 at its inner end.

The cylinder or bore 19 is also provided with a concentric recess 55 which is formed in direct alignment with the relief port 52 to provide an enlarged outlet from the port to the cylinder bore 19. The outlet port 8 and relief port 52 are in communication through an intermediate line 56 positioned longitudinally in the projection 51. Pipe plugs 57 and 58 are inserted at the outer ends of the openings 52 and 56 respectively. At the outer end of the bore 19, the casing head nut 28 is provided with a drain port 59 having connections with line 16 as above described. It will now readily be seen that as the balanced valve 21 is moved from its normal closed position in the cylinders 18 and 19 the piston 30 will move slightly past the recess 53 and at the same time the tapered portion 33 will raise the check valve 48 and the piston 29 will close the relief port 52, so that the inlet port 9 and outlet port 8 as well as the recess 54 are in direct communication, whereby the fluid pressure is caused to act upon the cylinders 3 and in turn upon the wheel brakes. As before stated, the valve 21 is constantly in a balanced condition due to the fluid pressure acting equally and oppositely on the disposed areas of the pistons 26 and 30. It will be readily apparent that as the fluid pressure builds up in the lines 5 after applying the brakes, this balanced feature is overcome by fluid pressure acting against the piston 30 in recess 54 thus forcing the balanced valve against the coil spring 22 and moving sufficiently to close the outlet port 8 and still maintaining a closed position at port 52.

The operation of the braking system is as follows:

To apply the brakes, the operator presses against the foot pedal 46 in the usual manner, which in turn acts through the rod 39 and the opened compression spring 22 to move the balanced control valve 21, thus initially opening the check valve 48 and permitting the fluid pressure to enter the cylinder 18, between and bearing equally against the pistons 26 and 30. Continuation of the movement of the balanced valve 21 will cause the piston 29 to close the relief port 52 and simultaneously the piston 30 will move within the recess 53 to permit the fluid pressure to communicate with outlets 8 and lines 5 acting upon the cylinders 3 connected with the braking mechanism. For any given amount of movement of the foot lever 40 a corresponding proportionate pressure is applied to the brakes by means of the cylinder 3, which pressure likewise builds up against the piston 30 in the recess 54 and moves the balanced valve 21 in the opposite direction, compressing the spring 22 against the cup member 24 and the position as held by the foot lever 40 until the outlet port 8 is closed, thereby cutting off any further pressure against the brakes. Upon further movement of the foot lever 40, the cycle of operation is repeated until the maximum compression of the spring 22 is reached, and thus permitting the maximum fluid pressure available (which corresponds approximately to the compression of the spring 22) to be applied to the brakes.

Upon releasing the foot lever 40 to its normal off position the balanced valve is caused to return to its normal closed position due to releasing all the compression from spring 22 and the built-up pressure acting to return the balanced valve to its normal position and by the light spring 23. In returning to its normal position the relief port 52 is opened, thus permitting the built-up fluid pressure to return to the source of supply, and relieving the pressure against the brakes as well as against the balanced valve.

I claim:

1. In a control valve for fluid pressure control devices, a pressure regulating device, a manual means for operating said device, a resilient member intermediate said manual means and said device, said device comprising two spaced piston elements adapted to receive the fluid pressure between them and be balanced thereby and a third piston element connected with said device and movable therewith for controlling the pressure and for releasing of same from said valve.

2. In a vehicle brake control device, the combination of a casing communicating with a brake system and having inlet and exhaust ports, an inlet valve controlling the passage of motive fluid through said inlet port to said casing, a piston working in said casing for opening said inlet valve and for controlling the passage of said motive fluid through said exhaust port to said brake system, said piston being balanced prior to the flow of motive fluid through the exhaust port and manual means to control the movement of said piston.

3. In a vehicle brake control device, the combination of a casing communicating with a brake system and having inlet and exhaust ports for a motive fluid and a third port communicating with said exhaust port, a valve member slidable within said casing said member having two pistons with an intermediate portion adapted to communicate with said inlet and exhaust ports, means actuated by the movement of said valve member to control the passage of motive fluid through said inlet port and to establish a balanced condition of said valve member and means cooperating with said third port and acting on said valve member for applying a variable braking pressure to said brake system.

4. In a vehicle brake control device, the combination of a casing communicating with a brake system and having inlet and exhaust ports for a motive fluid and a third port communicating with said exhaust port, a valve member slidable within said casing, said member having two pistons with an intermediate portion adapted to communicate with said inlet and exhaust ports, means actuated by the movement of said valve member to control the passage of motive fluid through said inlet port and to establish a balanced condition of said valve member prior to the flow of motive fluid through the exhaust port, and means cooperating with said third port and acting on said valve member for applying a variable braking pressure to said brake system.

5. In a vehicle brake control device, the combination of a casing communicating with a brake system and having inlet and exhaust ports for a motive fluid and a third port communicating with said exhaust port, a valve member slidable within said casing and having a reduced portion to receive the motive fluid for balancing said valve and adapted to communicate with said exhaust port, a passage establishing communication between said exhaust port and said third port and manual means for resiliently actuating said valve member to establish successive communication of said reduced portion with said exhaust port and third port to thereby effect a breaking application proportional to the extent of movement of said manual means.

6. In a control valve for fluid pressure controlled devices comprising in combination a casing having inlet and exhaust ports and a third port in communication with said exhaust port, a valve member slidable within said casing and having an intermediate reduced portion adapted to communicate with said inlet and exhaust ports and spring means for actuating said valve.

7. In a control valve for fluid pressure controlled devices comprising in combination a casing having inlet and exhaust ports and a third port in communication with said exhaust port, a valve member slidable within said casing to communicate with said inlet and exhaust ports, said valve member having an intermediate reduced portion to form a pair of spaced pistons having inwardly presenting faces of substantially equal areas and thereby effect a balanced valve when in communication with said inlet port, a manually controlled plunger and a spring interposed between the plunger and the valve member.

In testimony whereof I affix my signature.

ERNEST G. McCAULEY.